United States Patent Office 3,272,059
Patented Sept. 13, 1966

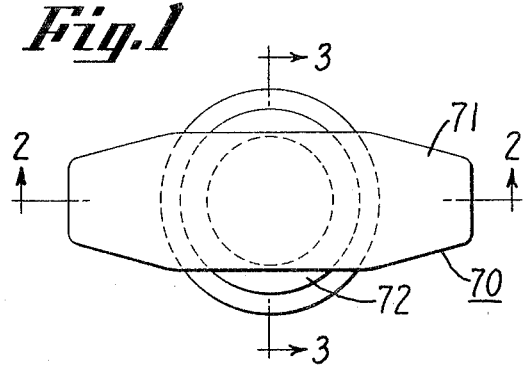
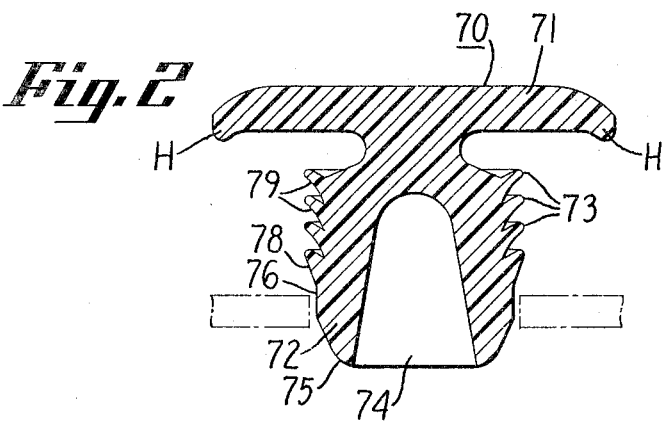
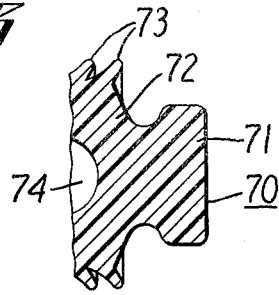
INVENTORS
RICHARD W. LYDAY
CLETUS L. MOORMAN
BY
ATTORNEY

3,272,059
PLASTIC HOLLOW-ENDED FASTENER
Richard W. Lyday, Brookville, and Cletus L. Moorman, Trotwood, Ohio, assignors to General Motors Corporation, Detroit, Mich., a corporation of Delaware
Original application June 22, 1961, Ser. No. 118,836. Divided and this application May 15, 1964, Ser. No. 367,848
1 Claim. (Cl. 85—5)

This invention relates to mechanism and procedure to assemble articles of manufacture such as fastening devices to elastomeric sealing strip means.

This application is a division of parent disclosure Serial No. 118,836—Lyday et al., filed June 22, 1961, now Patent No. 3,139,674—Lyday et al. issued July 7, 1964 to the assignee of the present invention together with an earlier divisional disclosure thereof, now Patent 3,199,187—Lyday et al. issued August 10, 1965.

An object of this invention is to provide a plastic fastening device for use specifically with an elastomeric sealing strip having a longitudinally extending cavity adjacent to an underside thereof and having a body including an elongated head portion of a length in a range between two to three times diameter of largest diameter of a stem portion integral on one side of the head portion and having a plurality of concentric rings centrally along the stem portion which can have a hollow end for radial resilience though outer peripheral surfacing of the end has an initial angular taper which increases toward the head portion though interrupted by a substantially uniformly cylindrical portion located intermediate the initial angular taper and adapted to align the fastening device axially with respect to a mounting aperture having a peripheral edge subject to interference press fitting engagement by the concentric rings at least one of which is provided with a secondary angular taper, the elongated head portion having hook-like opposite ends remote from each other though extending in a direction toward the stem portion.

Further objects and advantages of the present invention will be apparent from the following description, reference being had to the accompanying drawings wherein preferred embodiments of the present invention are clearly shown.

In the drawings:

FIGURE 1 is a plan view of a fastening device insertable on a sealing strip by assembly procedure in accordance with the present invention.

FIGURE 2 is a cross-sectioned elevational view taken along line 2—2 in FIGURE 1.

FIGURE 3 is a cross-sectioned end view taken along line 3—3 in FIGURE 1.

In a copending application Serial No. 126,419, filed June 22, 1961, now Patent 3,199,184—Harris et al. issued August 10, 1965 to the assignee of the present invention, there is a disclosure of apparatus and method of manufacture to assemble elastomeric sealing strip means and fastening devices to each other requiring multi-station stopping of movement of a sealing strip means. Further disclosure as to the sealing strip means per se can be found in application Serial No. 71,463, filed November 25, 1960, now U.S. Patent 3,110,938, dated November 19, 1963, and belonging to the assignee of the present invention. The sealing strip can be extruded or molded to have a preformed shape subject to mounting adjacent to a vehicle door, for example, as well as any other peripheral edge of an opening subject to closure by a cover and the like. In the aforementioned application Serial No. 126,419, now Patent 3,199,184—Harris et al. issued August 10, 1965, there is provision for aperturing an underside of a sealing strip so as to provide access to a longitudinally extending cavity in which head portions of plastic nail-like fastening devices such as disclosed in a copending application Serial No. 118,918, filed June 22,1961, now Patent 3,139,784—Moorman issued July 7, 1964 to the assignee of the present invention, can be installed in a subsequent station where a stop is made to permit further mechanism to dilate the hole or aperture formed in the sealing strip. Each of the embodiments of inserter mechanism of these patents as well as that of previously noted Patents 3,139,674—Lyday et al. issued July 7, 1964, and 3,199,187—Lyday et al. issued August 10,1965, will provide machine installation of fastening devices with elastomeric sealing strip means.

Details of a fastening device generally indicated by numeral 70 can be seen in further detail in FIGURES 1, 2 and 3 of the drawings. This fastening device includes an elongated or substantially football-shaped oblong head portion 71 and a stem portion 72 which together provide a body of plastic material. The head portion includes integral hook-like opposite ends H remote from each other though extending in a direction toward the stem portion. The distance or length between these hook-like opposite ends in the embodiment of the fastening means illustrated by FIGURES 1, 2 and 3 can be substantially twice the diagonal distance or diameter of a plurality of concentric barb-like rings 73 integral centrally with the stem portion 72. In the embodiment of the fastening device illustrated by FIGURES 1, 2 and 3, it is noted particularly that the stem portion 72 has a hollow interior end 74 so as to enhance resilience and facilitate flexing of an initial tapered portion 75. This initial tapered portion 75 serves as a guide for entry into a mounting panel aperture such as on a motor vehicle and an intermediate cylindrical portion 76 interconnects the initial tapered portion 75 and a secondary tapered portion 78 which extends radially outwardly still further to the outer peripheral edges of the concentric rings 73. Each of the rings 73 can be interconnected by an arcuate flared portion 79. As can be seen in the view of FIGURE 3, the head portion 71 is substantially rectangular in cross section and the hook-like opposite ends H are the only offsets provided integrally therewith.

It is to be noted that ratios of the oblong head portion 71 with respect to the diameters of the stem portion can differ so that different fastening devices can be assembled to elastomeric sealing strips adapted to fit differing sizes of mounting panel apertures on various motor vehicles. Interference fit of concentric rings such as 73 relative to differing sleeve-like members permit mechanical insertion of fastening devices into holes or apertures of elastomeric sealing strips having a longitudinally extending cavity therewith as shown by patents noted. For different vehicle installations hole sizes for mounting panel apertures can vary such as, for example, between 0.144 inch diameter, 0.187 inch diameter and 0.309 inch diameter.

It is to be noted that when fastening devices are assembled on a mass production basis relative to elastomeric sealing strip means, and many such fastening devices require a stop during inserting procedure, there can be a considerable loss of time which is completely avoided in accordance with the present invention by having an assembly head moving concurrently with movement of the sealing strip during the inserting procedure. When thousands of fastening devices are inserted relative to longitudinally extending sealing strip means, there can be an appreciable difference in labor and operating costs encountered when additional stopping time is required subsequent to drilling or aperturing of the sealing strip means to provide lateral access to the cavity of the sealing strip in which the head portions of the fastening devices are to be inserted leaving only the stem portions projecting laterally to one side of the sealing strip for mounting thereof relative to a vehicle mounting panel aperture.

While the embodiments of the present invention as herein disclosed constitute preferred forms, it is to be understood that other forms might be adopted.

What is claimed is as follows:

A unitary fastening device for elastomeric sealing strip cavity and mounting panel aperture installation, consisting of a body of plastic material having an elongated and substantially oblong head portion having integral hook-like opposite ends remote from each other at predetermined locations, a stem portion solid immediately adjacent to and integral axially at one end thereof with a central location of said elongated oblong head portion and having the lateral width of said stem portion less than that of said elongated oblong head portion, and a substantially annular enlarged extension of said stem portion including collectively an exterior initial tapered portion adjacent the end thereof remote from said elongated head portion, a secondary tapered portion extending radially outwardly further than said initial tapered portion, an intermediate cylindrical outer portion interconnecting said initial tapered portion and said secondary tapered portion, plural concentric barb-like rings axially spaced along said enlarged extension adjacent said solid stem portion with said secondary tapered portion defining the outer surface of the lowermost of said barb-like rings, and a hollow interior extending axially from said end thereof that is remote from said elongated oblong head portion and that enhances resilience and facilitates flexing of said exterior initial tapered portion which is a guide for entry into a mounting panel aperture as well as said intermediate cylindrical outer portion, each of said concentric barb-like rings being interconnected by an arcuate flared portion collectively all having a diameter greater than the lateral width of said central location of said elongated oblong head portion though the diameter thereof is specifically less than the longitudinal distance between predetermined locations of said hook-like opposite ends of said elongated oblong head portion.

References Cited by the Examiner

UNITED STATES PATENTS

| | | | |
|---|---|---|---|
| 1,915,249 | 6/1933 | Jorgensen | 24—208.3 |
| 1,998,791 | 4/1935 | Schanz | 24—208.3 |
| 2,851,078 | 9/1958 | Mellon et al. | |
| 2,853,913 | 9/1958 | Rapata | 85—5 |
| 2,984,877 | 5/1961 | Perrochat | 24—73 |
| 3,139,784 | 7/1964 | Moorman | 85—5 |

CARL W. TOMLIN, *Primary Examiner.*

R. S. BRITTS, *Assistant Examiner.*